United States Patent [19]

Echols

[11] Patent Number: 4,544,032
[45] Date of Patent: Oct. 1, 1985

[54] METHOD AND APPARATUS FOR PRODUCTION OF PERFECT WELL TREATMENT FLUID SOLUTIONS

[75] Inventor: John B. Echols, Houston, Tex.

[73] Assignee: Baker Oil Tools, Inc., Orange, Calif.

[21] Appl. No.: 596,021

[22] Filed: Apr. 2, 1984

[51] Int. Cl.⁴ .................. E21B 21/00; E21B 43/04; E21B 43/40
[52] U.S. Cl. .................. 166/267; 166/278; 166/75.1; 166/305.1; 252/8.55 R; 252/8.55 D; 366/302
[58] Field of Search ............... 166/246, 266, 267, 271, 166/273, 274, 275, 276, 278, 305 R, 307, 308, 75 R; 175/65, 66, 206, 207; 252/8.55 R, 8.55 D, 8.5 C; 366/302, 348; 536/87

[56] References Cited

U.S. PATENT DOCUMENTS

| | | |
|---|---|---|
| 1,883,597 | 10/1932 | Cowles .................... 366/348 X |
| 3,116,791 | 1/1964 | Sandiford et al. .............. 166/274 |
| 3,506,644 | 4/1970 | Parker ........................ 536/87 |
| 3,726,342 | 4/1973 | Rhudy et al. ................. 166/275 |
| 3,842,909 | 10/1974 | Rhudy et al. ................. 166/274 X |
| 4,046,197 | 9/1977 | Gruesbeck, Jr. et al. ........ 166/278 X |
| 4,420,406 | 12/1983 | House et al. ................. 252/8.55 R |
| 4,428,425 | 1/1984 | Young et al. ................. 252/8.55 R X |
| 4,435,564 | 3/1984 | House ........................ 252/8.55 R X |
| 4,448,535 | 5/1984 | West ......................... 366/302 X |
| 4,456,061 | 6/1984 | Swift, Jr. et al. ............ 166/75 R |

FOREIGN PATENT DOCUMENTS 670972 9/1963 Canada ........................ 166/275

OTHER PUBLICATIONS

Perry, R. J. et al., *Chemical Engineers' Handbook*, 5th ed., McGraw-Hill Book Company, pp. 8-42-44, 1973.

*Primary Examiner*—George A. Suchfield
*Attorney, Agent, or Firm*—Norvell & Associates

[57] ABSTRACT

A method and apparatus for providing and treating a well with a viscosity-enhanced treatment liquid which will not clog perforations, gravel packs, filters and the like. A selected viscosity-enhancing agent in particle size is mixed in a selected well treatment liquid to produce a dispersion and the mixing continued at least until hydration is initiated to form an interface between the particles and the liquid. The liquid containing the interface is then subjected to a simultaneous mechanical and hydraulic shearing action by passage through axial apertures in a relatively rotatable rotor and stator units which are disposed in axial juxtaposition with a spacing between the adjacent rotor and stator surfaces selected to be less than the minor dimensions of the interface produced by the dispersion of the selected well treatment liquid and viscosity-enhancing agent. Such treatment results in a substantially complete dissolution of the viscosity enhancing particles in the well treatment liquid, thereby producing a "perfect" solution, and eliminates clogging of well perforations, gravel packs, filters, and the like.

15 Claims, 4 Drawing Figures

METHOD AND APPARATUS FOR PRODUCTION OF PERFECT WELL TREATMENT FLUID SOLUTIONS

BACKGROUND OF THE INVENTION

1. Field of the Invention

The invention relates to the method and apparatus for effecting the complete dissolution of viscosity-enhancing dry particles in a liquid to eliminate the interface between partially dissolved particles and a liquid which normally clogs subterranean well formations, gravel packs and treating filters.

2. History of the Prior Art

There are a variety of chemical treatment operations performed in modern subterranean wells which involve the treatment of the formation, the gravel pack, or unconsolidated sand with high viscosity fluids, or solids carried by high viscosity fluids. Such fluids are generally formed by the attempted dissolution of any of one of a variety of viscosity enhancing materials in particle form in an aqueous solution which is generally one of a number of brines. Such fluids are employed as completion fluids, gravel packing fluids, stimulation fluids, frac fluids and are involved in such diverse operations as stimulation, secondary recovery and polymer floods. A common problem has, however, existed in the formulation of the solutions carrying the viscosity enhancing particles. Such particles are generally added to the liquid as dry, uncoated or precoated particles. If precoated, the coating is water soluble and merely delays the dissolution of the dry particle material during a mixing operation.

In every case, however, and regardless of the length of time or severity of the agitation or mixing, a large number of the dry particles will partially hydrate and may form a "gel" around the remainder of the particle which "gel" may vary in size from the forty microns range up to several centimeters. These "gel" formations are so common that they are commonly referred to as "fish eyes" and, if introduced into a well will have the effect of rapidly clogging the producing formations, a gravel pack or any other porous element with which they are brought into contact. Equally serious is the adverse effects upon any filter through which the gel containing solution is circulated, because the fish eyes will rapidly blind the filter and render it useless. This "gel" effect, or the incomplete dissolution of the viscosity-enhancing solid into the liquid is referred to herein and in the claims as the "interface".

There is, therefore, a definite need for a method and apparatus for eliminating the presence of the interface resulting from the introduction of dry, viscosity-enhancing particles within a liquid to produce a satisfactory well treatment fluid.

SUMMARY THE INVENTION

The invention provides a method and apparatus for effecting the more efficient treatment of various elements of a substerranean well, such as a production formation, a gravel pack or unconsolidated sand, wherein the treatment fluid desirably comprises an aqueous base solution of viscosity-enhancing particles which are added to the liquid phase in a dry form. In accordance with this invention, any conventional method of dispersing and mixing the viscosity-enhancing particles in the liquid phase may be employed and is continued until partial hydration of the particles occurs, resulting in the formation of an interface, sometimes also referred to as "fish eyes" or "stringers". The interface containing the fish eyes or stringers is then subjected to simultaneous mechanical and hydraulic shearing forces to effectively to break up the interface and produce the substantially complete dissolution of the particles of the viscosity-enhancing material in the liquid, thus creating a "perfect" solution. Such "perfect" solution can then be efficiently employed in any type of well treatment operation and will not result in any adverse clogging of formations, gravel packs, sand or the like, in the well or the formation. Moreover, any particulate material that is picked up by the treatment liquid can be readily separated at the well surface by conventional filtering devices, permitting the perfect solution of the viscosity-enhancing particles to be recirculated in the well, or stored for reuse.

In accordance with this invention, the application of combined mechanical and hydraulic shearing forces to the liquid containing the interface is preferably accomplished by pumping the liquid through two relatively rotatable discs. The discs have their end faces in axial juxtaposition and are spaced apart a distance corresponding to the smallest dimension of the interface normally produced by the particular viscosity-enhancing particles and the liquid being employed. Both discs are traversed by a plurality a peripherally spaced, radially aligned apertures and the passage of the dispersion through such apertures results in the interface being mechanically sheared as it enters the space between the juxtapositioned faces of the discs, and then subject to the hydraulic shearing action as it passes through the apertures in the discs. The combined mechanical and hydraulic shearing action on the interface produces a breakdown of the interface and causes the undissolved or partially dissolved portions of the viscosity-enhanced particles to enter into substantially complete solution in the liquid, thus creating the so-called "perfect" solution and eliminating all "fish eyes", "stringers" and the interface.

Further advantages of this invention will be apparent to those skilled in the art from the following detailed description, taken in conjunction with the annexed sheets of drawings, on which is shown a preferred form of apparatus employed in carrying out the method of this invention.

DESCRIPTION OF THE PREFERRED EMBODIMENT

Figure 1:
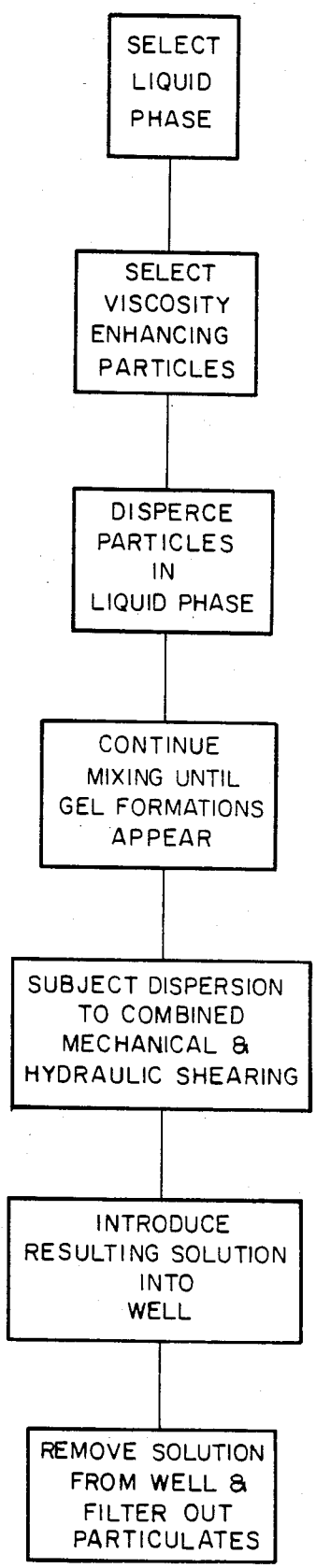
FIG. 1 is a block diagram schematically illustrating the various steps employed in the practice of this invention.

As is well known to those skilled in the art, in the preparation of a well treatment fluid, the first step necessarily must be the selection of the particular fluid to be employed (FIG. 1). This invention contemplates utilizing any one of the commonly employed well fluids, such as aqueous solutions of sodium chloride, calcium chloride, calcium bromide and zinc bromide. The particular solution selected is depending upon the well treatment operation to be performed and is selected in accordance with well known criteria.

When it is desired to significantly increase the viscosity of the selected well treatment fluid, then recourse may be had to any of the commonly employed viscosity-enhancing agents such as hydroxyethylcellulose, polysaccharides, polyesters, polyacrylates, and natural substances, such as quar gum, and the like. While any of these viscosity-enhancing agents may be employed, this invention preferably utilizes hydroxyethylcellulose which may be applied to the selected fluid either in dry particle form or in the form of dry particles coated with a soluble barrier material to retard the dissolution rate of the particles into the liquid.

In any event, the selected dry or coated dry particles are then intimately dispersed and mixed in the selected well treatment fluid, with the mixing being accomplished by conventional apparatus.

It has been observed that this mixing may result in the formation of an interface wherein a portion of the dry particle is hydrated and forms a "gel" surrounding the remaining undissolved portion of the particle. Such gel formations have discrete shapes and dimensions and are commonly known in the art as "fish eyes" or "stringers", depending upon whether they are of generally sperical configuration or appear as an elongated string. The gel coated formations or interface, may have a minor dimension as small as forty microns and may grow in its major dimensions to the size of several centimeters. Each selected viscosity-enhancing material will produce different physio-chemical interfaces depending upon the selected treatment fluid within which it is dispersed. In any event, the mixing of the viscosity-enhancing particles in the selected well treatment liquid continues until such interface appears, indicating that at least partial hydration of the viscosity-enhancing particles has occurred.

The next step of the invention is to subject the liquid containing the interface to a combined mechanical and hydraulic shearing forces so as to breakdown the interface. Once broken down, all of the undissolved viscosity-enhancing particles readily enter into solution in the selected well treatment fluid and the result is what is commonly known as a "perfect" solution, wherein all of the particles are substantially completely dissolved in the selected well treatment liquid and do not appear in the liquid as particulate matter. Such perfect solution has a substantially increased viscosity compared to the original viscosity of the selected well treatment liquid.

The viscosity modified well treatment liquid is then introduced into that portion of the well where treatment is required and, in the course of such treatment, generally picks up substantial quantities of contaminant particulate, either from well formations, drilling mud residuals, gravel packs, or sands through which the well treatment liquid flows.

Following the well treating operation, the viscosity-enhanced, well treating liquid with the entrained particulates is removed from the well and subjected to a filtering action to remove the particulate matter therefrom so as to permit recirculation of the treatment liquid into the well or storage of the liquid for reuse. In any event, the viscosity-enhanced well treatment liquid does not contain any gel formations which would effect a clogging of the filters through which it is passed to remove the extraneous particulates that the liquid has picked up during its sojourn in the well. This is a distinct advantage over prior art viscosity-enhanced well treating fluids which always contained a substantial quantity of gel formations which rapidly clogged production formations or gravel packs in the well with which it came in contact and equally rapidly produced a complete clogging or blinding of the surface filters through which it is passed in order to remove entrained particulate materials.

Figure 2:
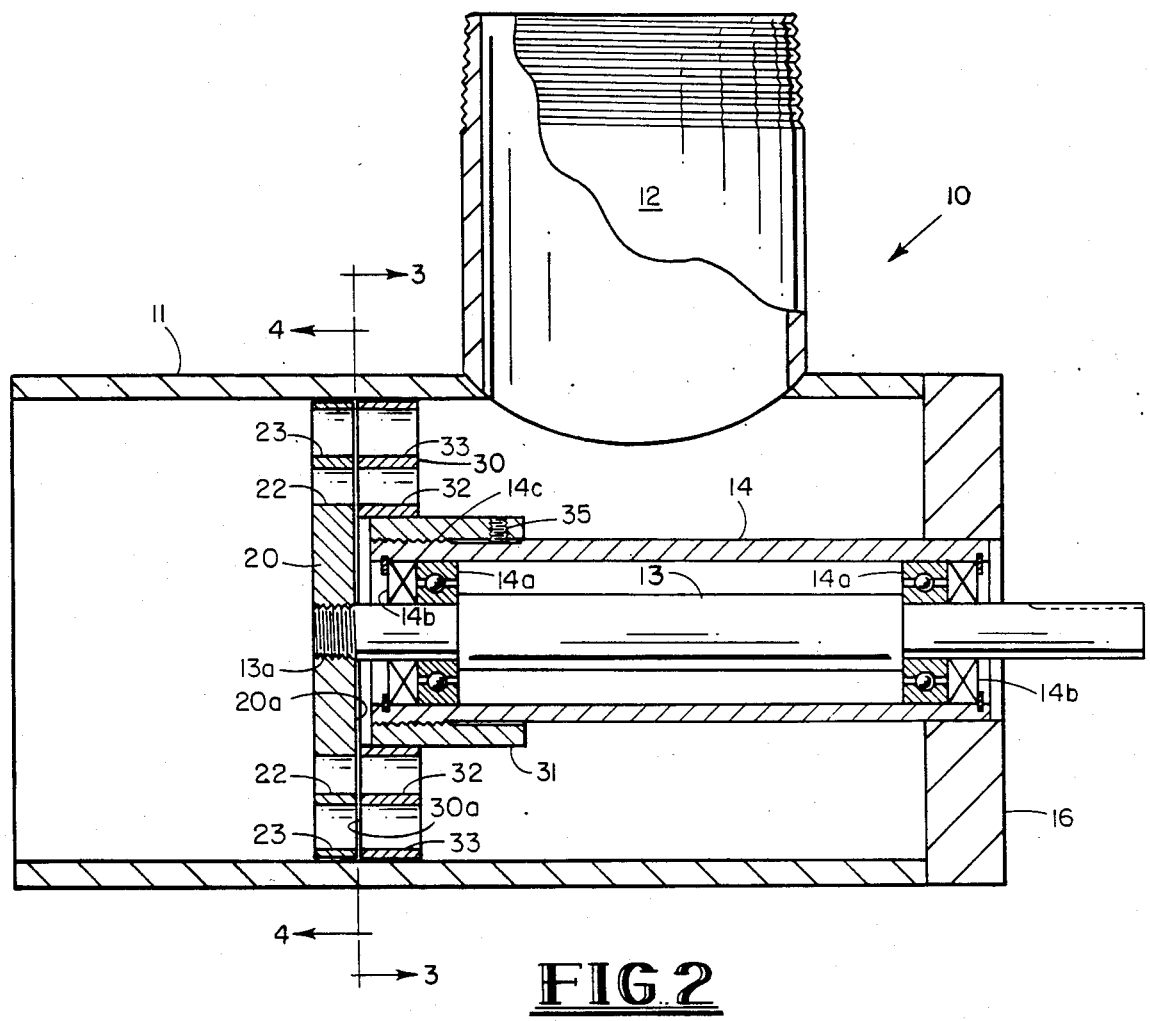
FIG. 2 is a vertical, sectional view of an apparatus for effecting combined mechanical and hydraulic shearing of interface produced as a result of one step of the method of this invention.
Figure 3:
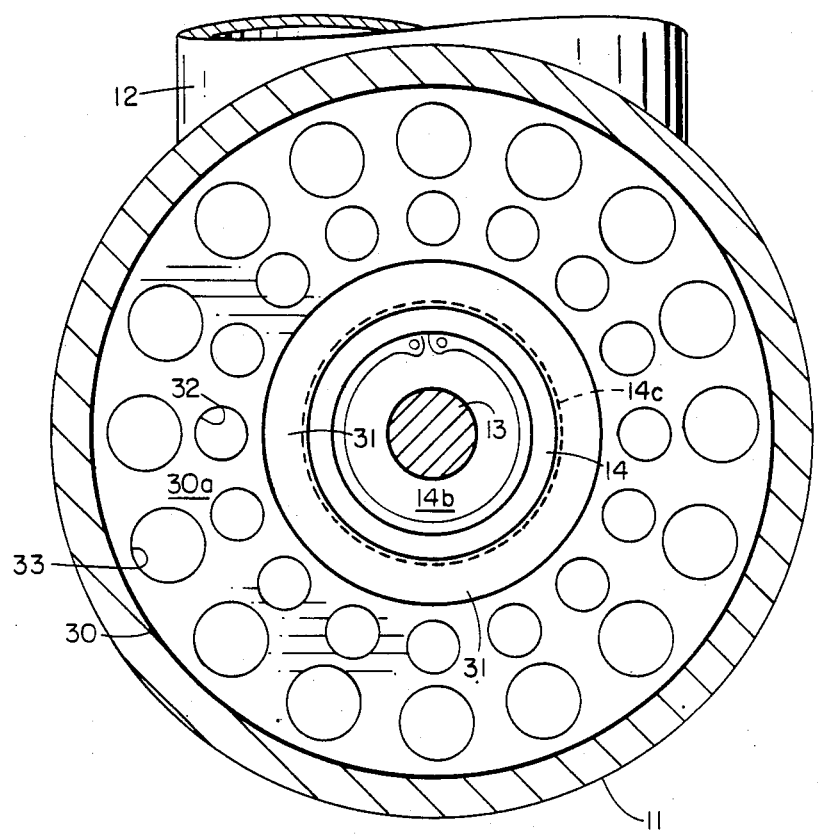
FIG. 3 is a sectional view taken on the plane 3—3 of FIG. 2.
Figure 4:
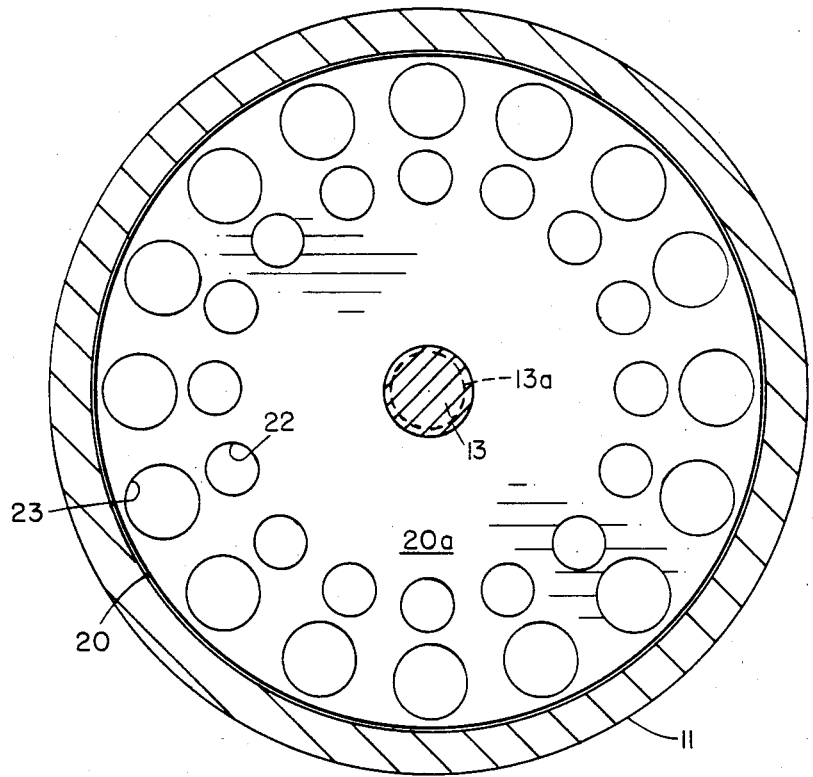
FIG. 4 is a sectional view taken on the plane 4—4 of FIG. 2.

The application of combined mechanical and hydraulic shearing forces to the liquid containing the interface is preferably accomplished with the apparatus illustrated in FIGS. 2–4. Such apparatus comprises a housing 10 having a generally cylindrical main body portion 11 and a radially disposed outlet port 12 integrally formed thereon. Within the housing 10, a shaft 13 is rotatably mounted in a bearing mounting sleeve 14 by anti-friction bearings 14a which are provided with appropriate seals 14b at each axial end to isolate the anti-friction bearings 14a from contact with liquids passing through the housing. Mounting sleeve 14 is press fitted within the bore of an annular block 16 which is suitably mounted within housing 10.

A rotor 20 is fixedly secured to the external threads 13a provided on one end of the shaft 13. A stator 13 is provided which is appropriately secured to a mounting sleeve 31, which in turn is secured to external threads 14c provided on the end of the drive shaft mounting sleeve 14. The axial position of the stator 30 relative to the rotor 20 may therefore be conveniently adjusted by rotational adjustment of the mounting sleeve 31 on the threads 14c. A set screw 35 effects the securement of the stator 30 in any desired position of axial separation relative to the rotor 20.

As best shown in FIG. 4, the rotor 20 is provided with a plurality of peripherally spaced apertures 22 and 23. The apertures 23 are disposed in a circle adjacent the periphery of the rotor 20, while the apertures 22 are disposed in a circle lying within the apertures 23. The stator 30 is provided with identically dimensioned and spaced apertures 32 and 33 so that when the rotor and the stator are stationary, the apertures 22 and 23 of the rotor can be respectively aligned with the apertures 32 and 33 of the stator 30. The drive shaft 13 is then rotated by suitable variable speed motor (not shown) and the axial spacing between the juxtapositioned faces 20a and 30a of the rotor 20 and the stator 30 is adjusted to be less than the minor dimensions of the interface normally produced through the dispersion of the selected viscosity-enhancing particles in the selected well treatment liquid. Such axial spacing generally falls within a range of from about forty to about 2 microns. The essential factor is that the axial spacing should be less than the anticipated minor dimensions of the interface to be passed through the axial gap between the rotor 20 and the stator 30.

The liquid containing the interface is pumped through the apparatus 10, entering at the left hand end thereof and passing axially through the apertures 22 and 23 of the rotor 20 and then through the apertures 32 and 33 of the stator 30 and then out through the discharge nozzle 12. During such passage, each gel coated formation is subjected to combined mechanical and hydraulic shearing which results in the substantially complete dissolution of the undissolved dry particle material contained within the interface resulting in the creation of a perfect solution.

The effectiveness of the viscosity-enhanced well treatment fluid produced with the method and apparatus of this invention is clearly demonstrated in comparative tests. In one test, a viscosity-enhanced aqueous brine solution of hydroxyethylcellulose (mixed with potassium hydroxide) was formulated in conventional fashion and then passed through a Dicalite pressure test filter unit. At 30 psi, the flow rate through an approximately ⅜ths inch precoat on the filter was 0.020 gpm/ft². When the same fluid was prepared in accordance with the method of this invention, including the mechanical and hydraulic shearing of the interface produced during the initial mixing of the viscosity-enhancing hydroxyethylcellulose, the flow rate through the same filter having the same thickness of precoat was 0.38 gpm/ft², or almost twenty times greater than the rate at which the conventionally prepared well treating fluid passed through the filter.

The variable speed drive for shaft 13 of the apparatus is desirable to maintain throughput of different fluids which may have substantially different viscosities, which, of course, impose different loadings on the apparatus.

It is therefore apparent that the method and apparatus of this invention provides a viscosity-enhanced well treating liquid which produces a far higher degree of freedom from clogging of production formations, gravel packs, filters and the like, when introduced into the well. The advantage of such a well treatment liquid to the well operator in reduction of treatment time and expense incurred therefor will be readily apparent to those skilled in the art.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. The method of treating a subterranean well with an increased viscosity liquid solution and reducing clogging of formations or gravel packs, with such solution, comprising the steps of:
   (1) mixing dry viscosity-enhancing particles into a liquid phase to produce a dispersion of the dry particles in the liquid phase;
   (2) mixing the dispersion until at least hydration of the viscosity-enhancing particles is initiated, thereby forming an interface between the particles and the liquid phase;
   (3) subjecting the dispersion to concurrent mechanical and hydraulic shearing forces sufficient to break down the interface and perfecting the dissolution of the viscosity-enhancing particles into the liquid phase; and
   (4) introducing the resultant perfect solution into a subterranean well for treatment of at least a portion thereof.

2. The method of treating a subterranean well with an increased viscosity liquid solution and reducing clogging of formations or gravel packs, with such solution, comprising the steps of:
   (1) mixing dry viscosity-enhancing particles into a liquid phase to produce a dispersion of the dry particles in the liquid phase;
   (2) mixing the dispersion until at least hydration of the viscosity-enhancing particles is initiated, thereby forming an interface between the particles and the liquid phase;
   (3) subjecting the dispersion to concurrent mechanical and hydraulic shearing forces sufficient to break down the interface and perfecting the dissolution of the viscosity-enhancing particles in the liquid phase;
   (4) introducing the resultant perfect solution into a subterranean well for treatment of at least a portion thereof; and
   (5) removing the perfect solution from the well and filtering entrained contaminate particulates therefrom to permit re-introduction of the perfect solution into a subterranean well.

3. The process of claim 1 or 2 wherein said viscosity-enhancing particles comprise at least one of the class of hydroxyethylcellulose, a polysaccharide, a polyester, a polyacrylate; and quar gum.

4. The process of claim 1 or 2 wherein the liquid phase comprises an aqueous solution of at least one of the class of sodium chloride, calcium chloride, calcium bromide and zinc bromide.

5. The process of claim 1 or 2 wherein step 3 is performed by passing the dispersion axially through apertures formed in two relatively rotating discs, said discs being axially separated by a distance less than the minor dimensions of the interface thereby imposing a mechanical and hydraulic shear on the interface passing axially through the relatively rotating apertures.

6. The process of claim 5 wherein the axial clearance between the relatively rotating discs is selectively adjustable to fall in the range of about forty to about 2 microns.

7. The process of claim 5 wherein the relative rotation speed of the apertured discs is varied as a function of the apparent viscosity of the dispersion.

8. The method of preparing a well treatment fluid comprising a perfect solution of viscosity-enhancing particles in a liquid phase, comprising the steps of:
   (1) dispersing the viscosity-enhancing particles in the liquid phase;
   (2) mixing the dispersion until at least hydration of the viscosity-enhancing particles is initiated, thereby forming an interface between the particles and the liquid phase; and
   (3) subjecting the dispersion to concurrent mechanical and hydraulic shearing forces sufficient to break down the interface and completing the dissolution of the viscosity-enhancing particles in the liquid phase.

9. The process of claim 8 wherein said viscosity-enhancing particles comprise at least one of the class of hydroxyethylcellulose, a polysaccharide, a polyester, a polyacrylate and quar gum.

10. The process of claim 9 wherein the liquid phase comprises an aqueous solution of at least one of the class of sodium chloride, calcium chloride, calcium bromide and zinc bromide.

11. The process of claim 8 wherein step 3 is performed by passing the dispersion axially through apertures formed in two relatively rotating discs, said discs being axially separated by a distance less than the minor dimensions of the interface to impose a mechanical shear on the interface passing axially through the relatively rotating apertures.

12. The process of claim 11 wherein the axial clearance between the relatively rotating discs is adjusted to fall in the range of about 40 to about 2 microns.

13. The process of claim 11 wherein the relative rotational speed of the apertured discs is varied as a function of the apparent viscosity of the dispersion.

14. The method of preparing a well treatment fluid comprising a perfect solution of water soluble polymer particles in an aqueous fluid comprising the steps of:

(1) dispersing the polymer particles in the aqueous fluid;

(2) mixing the dispersion until at least hydration of the soluble polymer particles is initiated, thereby forming an interface between the polymer particles and the aqueous fluid; and (3) subjecting the dispersion to concurrent mechanical and hydraulic shearing forces sufficicent to break down the interface and perfecting the dissolution of the polymer particles into the aqueous solution.

15. The process of claim 1 wherein said soluble polymer particles comprises at least one of the class of hydroxyethylcellulose, a polysaccharide, a polyester, a polyacrylate and quar gum.

* * * * *

UNITED STATES PATENT AND TRADEMARK OFFICE
CERTIFICATE OF CORRECTION

PATENT NO. : 4,544,032

DATED : October 1, 1985

INVENTOR(S) : John B. Echols

It is certified that error appears in the above-identified patent and that said Letters Patent is hereby corrected as shown below:

On the title page, Item "[73] Assignee: Baker Oil Tools, Inc., Orange, Calif." should be deleted.

Signed and Sealed this

Fourteenth Day of January 1986

[SEAL]

Attest:

DONALD J. QUIGG

Attesting Officer

Commissioner of Patents and Trademarks